United States Patent [19]

Shirasagi et al.

[11] Patent Number: 5,048,634
[45] Date of Patent: Sep. 17, 1991

[54] MOTOR BICYCLE

[75] Inventors: Sadao Shirasagi; Seishiro Kaneta, both of Hamamatsu, Japan

[73] Assignee: Suzuki Jidosha Kogyo Kabushiki Kaisha, Japan

[21] Appl. No.: 517,426

[22] Filed: May 1, 1990

Related U.S. Application Data

[63] Continuation of Ser. No. 221,928, Jul. 20, 1988, abandoned.

[30] Foreign Application Priority Data

Jul. 21, 1987 [JP] Japan .................................. 62-180155

[51] Int. Cl.$^5$ ................................................ B62J 9/00
[52] U.S. Cl. ................................................ 180/219
[58] Field of Search .................... 180/219; 280/288.4; 224/33 R

[56] References Cited

U.S. PATENT DOCUMENTS

| 3,937,484 | 2/1976 | Morioka et al. | 180/219 |
| 3,944,009 | 3/1976 | Katagiri | 180/219 |
| 4,696,363 | 9/1987 | Enda | 180/219 |
| 4,700,799 | 10/1987 | Kawano | 180/219 |
| 4,723,620 | 2/1988 | Ono | 180/219 |
| 4,727,953 | 3/1988 | Kudo et al. | 180/219 |
| 4,796,719 | 1/1989 | Shiratsuchi | 180/219 |
| 4,830,134 | 5/1989 | Hashimoto | 180/219 |
| 4,940,111 | 7/1990 | Nogami et al. | 180/219 |

FOREIGN PATENT DOCUMENTS

| 262912 | 4/1988 | European Pat. Off. | 180/219 |
| 2184990 | 7/1987 | United Kingdom | 180/219 |

*Primary Examiner*—Mitchell J. Hill
*Attorney, Agent, or Firm*—Bruce L. Adams; Van C. Wilks

[57] ABSTRACT

A motor bicycle is provided with a main frame supporting a head tube operatively connected a steering shaft of a front wheel. The main frame includes a backborn which is connected to the head tube and extends rearwardly along the main body of the motor bicycle and the backborn comprises two members extending rearwardly from the head tube with a certain angle in bilaterally oblique directions in a plan view. A helmet storage box is disposed in a space between these two members, the seat and the head tube so as to have an inner volume sufficient for accommodating a helmet or the like. This arrangement makes it possible to locate a fuel tank below the seat without changing the outer appearance of the motor bicycle.

1 Claim, 3 Drawing Sheets

MOTOR BICYCLE

This is a continuation application of application Ser. No. 221,928, filed July 20, 1988, now abandoned.

BACKGROUND OF THE INVENTION

This invention relates to a motor bicycle having an engine at a central lower portion thereof and having a space sufficient for locating a box-like member in which a helmet or the like can be started.

A driver or rider who drives a motor bicycle usually wears a helmet on his head or is obliged to do so for security sake, and the helmet is usually left on or with the motor bicycle when he leaves from the motor bicycle at a parking time, for example. However, a conventional motor bicycle is not provided with any specific equipment for accommodating the helmet in a motor bicycle body, so that the rider or driver is obliged to bring the helmet or lock it to the motor bicycle when he leaves therefrom.

In a certain conventional technique, there is provided a motor scooter in which a stepped portion is arranged on a downwardly curved portion between a handle mechanism and a seat and a space sufficient for accommodating the helmet is defined at the lower portion of the seat by covering with an outer body with the seat as a cover for the space (for example, as disclosed in the Japanese Patent Laid-open Publication Nos. 154964/1985 or 282178/1986).

However, with a usual type motor bicycle in which the engine is mounted at the lower portion of the motor bicycle body, since a ride-on type seat is utilized, it is difficult to design the lower portion of the seat to have a wide lateral width and also to provide a space below the seat because the wheels of the motor bicycle have relatively large diameters in comparison with those of the motor scooter. Thus, with the conventional motor bicycle with an engine loaded at the central lower portion of the body, it is difficult to ensure a space for accommodating the helmet below the seat or in another portion of the motor bicycle body. Accordingly, when the rider leaves the motor bicycle, the helmet is left for example by hanging it from a portion of the motor bicycle body or he must carry about the helmet for preventing the helmet from being robbed, thus being inconvenienced.

Japanese Utility Model Publication No. 3572/1988 discloses a motor bicycle provided with a box for accommodating a helmet between a head tube and a seat by downwardly bending a body frame. However, the downward bending of the body frame provides problems on the rigidity thereof and the manufacturing, such as by a molding method, of the same. Moreover, when the motor bicycle is running, a driving stress is largely given to a portion joining the upper portion of the body frame and the head tube, and therefore, it is not desired to bend downwardly the body frame for bearing such driving stress.

SUMMARY OF THE INVENTION

An object of this invention is to substantially eliminate or overcome the defects or drawbacks in the conventional technique and to provide a motor bicycle provided with a space for accommodating a helmet or the like by rearranging a fuel tank, an air cleaner unit, or the like relatively having a large volume.

This and other objects can be achieved according to this invention by providing a motor bicycle in which a steering front wheel and a driving rear wheel are arranged at front and rear portions of the main body of the motor bicycle and an engine is located at a central portion of the main body, the motor bicycle of this type comprising a main frame supporting a head tube supporting a steering shaft operatively connected to the front wheel, the frame including a biforked element secured to the head tube and comprising two members rearwardly extending from the head tube at a certain angle; a box-like member disposed in a space defined between the head tube, the seat and the two members of the biforked element with an upper opening and adapted to accommodate a helmet for a rider or the like; a cover for covering the upper opening of the box-like member to be upwardly openable; an air cleaner located between and below the box-like member and the seat and having a portion connecting the box member and the seat; and a fuel tank located below the seat.

According to the construction of the motor bicycle of this invention, a helmet or the like can be accommodated in a lockable storage box located between handlelevers and a seat, and a flat fuel tank is disposed below this arrangement. Accordingly, the outer appearance of the motor bicycle is not changed from that of a conventional motor bicycle. Since the helmet storage box can be constructed to be compact with a suitable inner space, a portion, such as a silencer, or an air clear unit, can be arranged between the seat and the storage box. The fuel tank has no limitation in the shape and is guarded by the body, the seat and a rear fender, so that the fuel tank is formed or molded by a blow formation of a synthetic resin even in a relatively complicated shape, thus advantageously utilizing the space below the seat and the air cleaner unit.

The preferred embodiment of the motor bicycle according to this invention will be described hereunder further in detail with reference to the accompanying drawings.

BRIEF DESCRIPTION OF TH( DRAWINGS

DESCRIPTION OF THE PREFERRED EMBODIMENTS

Figure 1:
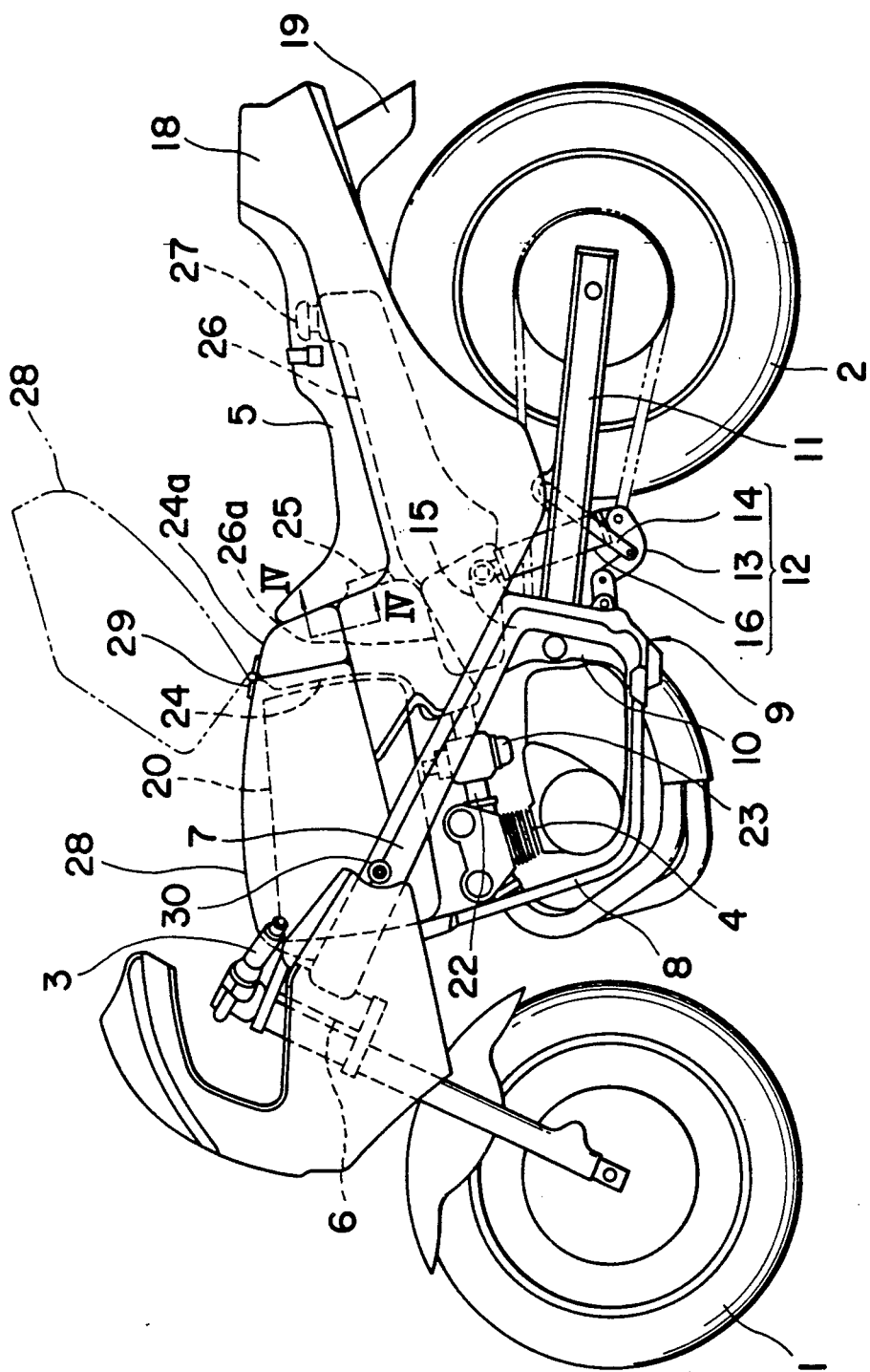
FIG. 1 is a side view of a motor bicycle according to this invention.

Referring to FIG. 1 showing a side view of a motor bicycle or two-wheeled motorized vehicle according to this invention, the motor bicycle includes a front wheel 1 steerable by handlelevers 3, a rear wheel 2 driven by an internal combustion engine 4 incorporated in a central lower portion of a body of the motor bicycle, and a ride-on type seat 5 disposed at a rear upper portion of the body.

The engine 4 is accommodated in a main frame 9 which is constructed in substantially a trapezoidal shape by a biforked element 7 extending from a front portion of the body rearwardly and then curving downwardly and a down tube 8 also extending from the front portion of the body rearwardly downwardly and then curving rearwardly. A head tube 6 adapted to support a steering shaft for steering the front wheel 1 is supported at the front end of the thus constructed main frame 9.

The rear wheel 2 is supported through an axle at the rear end of a swing arm 11 pivoted swingably to a reinforcing member 10 disposed at the rear portion of the main frame 9 and the rear wheel 2 is also suspended by a mono-suspension mechanism 12 so as to snub or buffer the same. The mono-suspension mechanism 12 comprises a link 13 having a front end pivoted to a rear lower portion of the main frame 9 and extending rearwardly therefrom, a link 14 having one end connected at substantially the central portion on the first mentioned link 13 and the other end connected to a front portion of the swing arm 11, and a buffer unit 16 having one end connected to a bracket 15 secured to a rear upper portion of the main frame 9 and the other end connected to a rear end of the link 13.

A rear frame 17 (FIG. 2) is connected to the main frame 9 so as to rearwardly extend upwardly obliquely, the rear frame 17 being adapted to support the seat 5 and being covered by a rear cover 18, and a rear fender 19 is connected to the rear portion of the rear cover 18.

In the foregoing, although the various components or parts of the motor bicycle are described with reference to one side thereof, it will be easily understood that substantially symmetrical arrangement is done on the other side of the motor bicycle.

Figure 3:
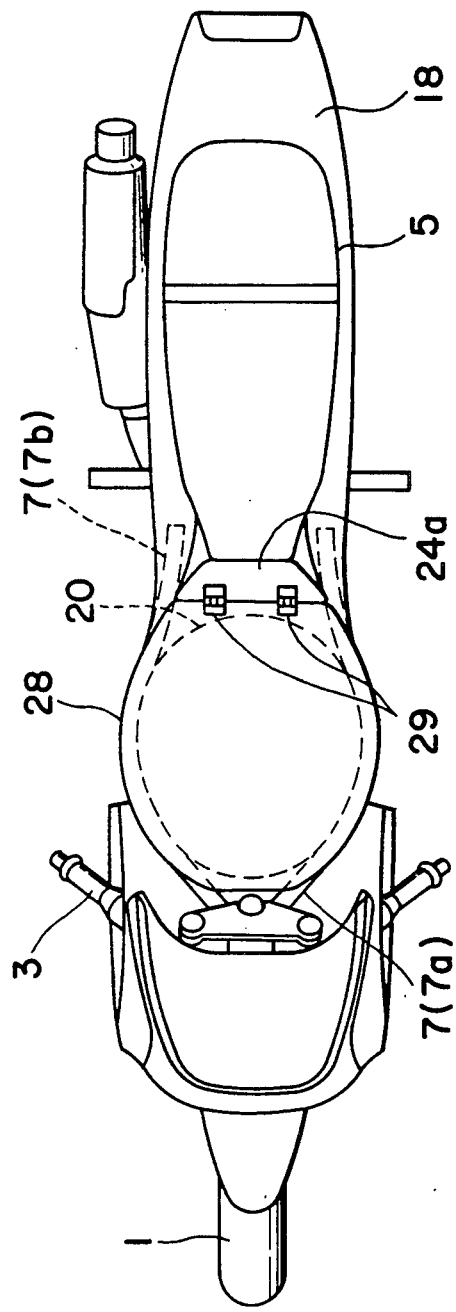
FIG. 3 is a plan view of the motor bicycle shown in FIG. 1 or 2.

The biforked element 7 comprises two members rearwardly extending from the head tube 6, and as shown in FIG. 3 by dotted lines, in a plan view, these two members 7a and 7b extend bilaterally obliquely at a certain angle therebetween so as to define a space therebetween to arrange a helmet storage compartment or storage box 20. The rear portions of these members 7a and 7b extend along the outer configuration of the storage box 20, for example, in a curved shape. Thus, the angle defined by the members 7a and 7b can be optionally determined as a matter of design. The storage box 20 is upwardly openable and has an inner space of sufficient size and shape for accommodating a helmet 21 or the like and the space may be preferably designed so as to accommodate the largest type helmet therein.

An air cleaner case 24 is disposed at a rear lower portion of the storage box 20, the air cleaner case 24 being connected to an intake passage 22 of the engine 4 through a carburetor 23 and being provided with a silencing unit 24a extending upwardly along the rear surface of the storage box 20 and positioned adjacent to the seat 5. Air intake port 25 for the air cleaner case is opened to the lower portion of the seat 5.

A fuel tank 26 of flat type made of a synthetic resin having a front end portion 26a extending towards the lower side of the air cleaner case 24 is located below the seat 5 along the lower surface of the seat 5. The fuel tank 26 is provided with a fuel port 27 opened upwardly at the rear end portion of the fuel tank 26, the fuel port 27 being usually covered by the seat 5. The front end portion 26a of the fuel tank 26 is provided with a central cutout recessed portion, not shown, into which are arranged the lower edge portion of the air cleaner case 24, the mono-suspension 12 and the bracket 15. The rear cover 18 covers both sides of the fuel tank 26 so as to serve as a protecting plate and also covers both sides of the air cleaner case 24 with the extending front portion of the rear cover 18.

Figure 2:
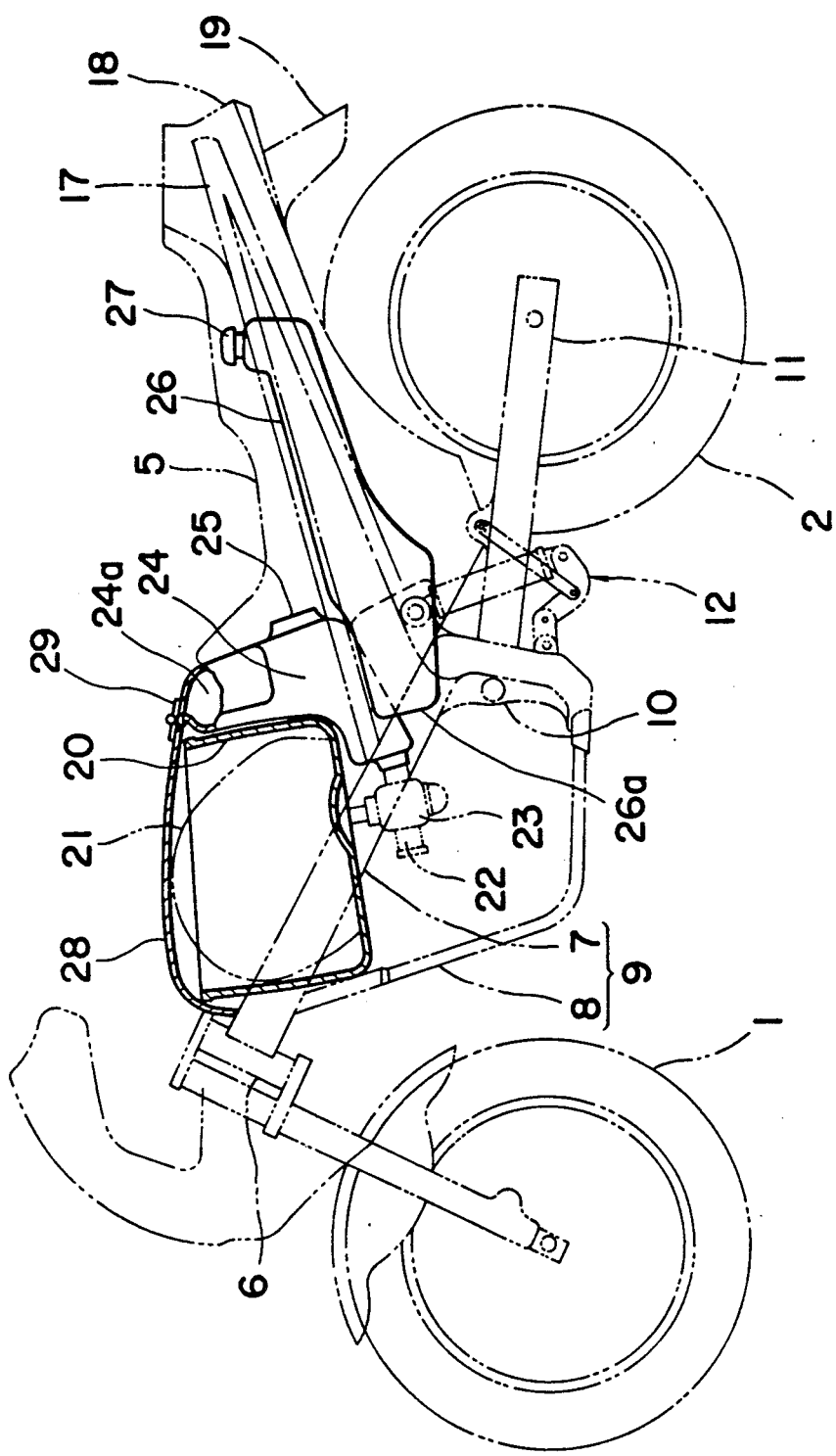
FIG. 2 is also a side view of the motor bicycle, with some parts in cross section and other parts in broken lines, showing an arrangement of a storage box for a helmet.
Figure 4:
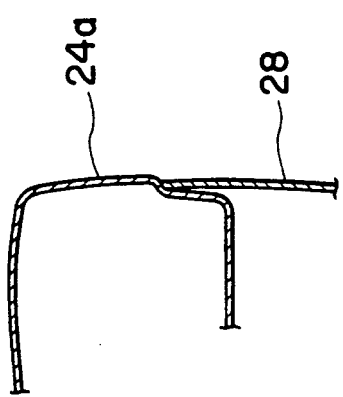
FIG. 4 is a cross section in an enlarged scale of a portion of an air cleaner of the motor bicycle, taken along the line IV—IV of FIG. 1.

The upper and both side surfaces of the storage box 20 can be covered by a cover or cover member 28 having a configuration suitable for accommodating a helmet therein. The cover 28 is provided with a rear end edge pivotably secured by hinge means to the upper surface of the silencer unit 24a of the air cleaner case 24 so that the cover can be pivoted in an upward direction to open the storage box 20 (FIG. 1) and pivoted in a downward direction to a closed position to close the storage box 20 (FIG. 2). The cover 28 can be locked by locking means 30 when the cover 28 is closed. The cover 28 is so designed that the opposite side portions of the cover 28 can form, when the cover 28 is closed, a smooth surface with substantially no stepped portion together with the side surface of the biforked element 7, the side surface of the silencer unit 24a and the side surface of the rear cover 18. The engaged condition of the cover 28 and the silencer unit 24a of the air cleaner is illustrated in FIG. 4 as a partial sectional view.

It should be understood by persons in the art of this field that this invention is not limited to the described embodiment and other various modifications and changes may be made without departing the nature or scope of the appended claims. For example, the shape of the biforked element 7, i.e. two portions constituting the same, of the main frame may be variously designed so as to meet with the configuration of the helmet storage box 20. Moreover, the helmet storage box 20 may be itself modified so as to put other materials therein if the interior thereof has an extra space.

What is claimed is:

1. A motor bicycle having a steering front wheel and a driving rear wheel arranged at front and rear portions, respectively, of a main body of a motor bicycle, a seat located substantially above said rear wheel, and an engine unit located at a central lower portion of the main body, comprising:

a main frame having a head tube supporting a steering shaft connected to the front wheel, said main frame including a biforked element secured to said head tube and comprised of two frame elements rearwardly extending from said head tube and diverging from each other at a certain angle;

a box-like member defining a helmet storage box having opposed opposite sides, an inner volume of sufficient size to accommodate a helmet for a rider and an upper opening, said helmet storage box being disposed in a space defined behind said head tube, in front of said seat and above said engine unit and by said two frame elements of the biforked element which extend along the outside of the opposite sides of said helmet storage box, said helmet storage box having a bottom portion inclined forwardly downwardly;

a cover having a top portion hinged to said helmet storage box at a rear portion thereof for covering the upper opening of said box-like member when said cover is in a closed condition;

an air-cleaner case disposed above said engine unit and having a portion below the inclined bottom portion of said helmet storage box and a portion between said helmet storage box and said seat; and a fuel tank located below said seat and above said rear wheel, said fuel tank being inclined forwardly downwardly.

* * * * *